United States Patent
Sheu et al.

(10) Patent No.: US 6,717,892 B2
(45) Date of Patent: Apr. 6, 2004

(54) OPTICAL DISK DRIVE WITH ADAPTIVE COMPENSATOR

(75) Inventors: Jia-Shing Sheu, Taipei Hsien (TW); Cheng-Hung Chen, Nan-Tou Hsien (TW)

(73) Assignee: VIA Technologies Inc., Hsin-Tien (TW)

(*) Notice: Subject to any disclaimer, the term of this patent is extended or adjusted under 35 U.S.C. 154(b) by 138 days.

(21) Appl. No.: 10/063,311

(22) Filed: Apr. 10, 2002

(65) Prior Publication Data

US 2002/0167875 A1 Nov. 14, 2002

(30) Foreign Application Priority Data

May 11, 2001 (TW) .......................... 90111345 A

(51) Int. Cl.$^7$ ................................. G11B 7/00
(52) U.S. Cl. ............... 369/44.14; 369/44.25; 369/112.01
(58) Field of Search .............. 369/44.14, 44.15, 369/44.25, 44.27, 44.28, 112.01

(56) References Cited

U.S. PATENT DOCUMENTS 5,124,965 A * 6/1992 Mizuno et al. .......... 369/44.22
6,339,565 B1 * 1/2002 Zhao ....................... 369/44.28

* cited by examiner

Primary Examiner—Muhammad Edun
(74) Attorney, Agent, or Firm—Winston Hsu

(57) ABSTRACT

An optical disk drive for accessing data stored on a compact disc has a housing, a sled sliding inside the housing, a driving device for driving the sled, an actuator installed on the sled, a servo device for providing a push force to drive the actuator, a control circuitry for controlling operations of the optical disk drive, an adaptive compensator, and an error signal generation circuit. The actuator can move within a predetermined range on the sled, wherein the predetermined range includes a linear region and a non-linear region. It is desirable to keep the actuator within the linear region of the predetermined range. For this, an adaptive compensator is used to provide a supplementary force to the sled when the actuator is near the non-linear region.

6 Claims, 6 Drawing Sheets

OPTICAL DISK DRIVE WITH ADAPTIVE COMPENSATOR

BACKGROUND OF INVENTION

1. Field of the Invention

The present invention relates to an optical disk drive (for example, compact disk drive or DVD drive) capable of reading data stored on an optical disk (for example, CD or DVD). More specifically, the present invention discloses an optical disk drive comprising an adaptive compensator for preventing an actuator from entering a non-linear region.

2. Description of the Prior Art

In current technology, an optical disk is lightweight, small physical volume, and low cost. In addition, optical disks have a high capacity for information storage, making optical disks an indispensable information-storing medium.

Of course, high-density information stored on an optical disk is read out by an optical disk drive for further processing. The high-speed requirements of modern society demand not only a continuous increase of data storage density on the optical disk, but also demand a high speed optical disk drive for reading the data on the optical disk. In order to allow the optical disk drive to read high-density data quickly, the optical disk drive must have a precise control system. Therefore, developing a precise control system for the optical disk drive is an important topic of the information industry.

Please refer to FIG. 1. FIG. 1 is a perspective view of an optical disk drive 10 according to the prior art. The optical disk drive 10 reads data stored on an optical disk 14. The optical disk drive 10 includes a housing 12 and a rotatable base 16 installed on the housing 12. The housing 12 further comprises a hole 17 that shows a sled 18 inside the housing 12. The sled 18 inside the housing 12 is capable of sliding left and right so as to scan data stored on the optical disk 14. When the optical disk 14 is put on the base 16 and rotated by the base 16, the sled 18 slides left and right along the hole 17 so that the optical disk drive 10 reads data stored on the optical disk 14.

For further illustration of the inner construction of the optical disk drive 10, please refer to FIG. 2. FIG. 2 is a perspective view of the inner structure of the optical disk drive 10 according to the prior art. In order to clearly show the inner structure of the optical disk drive 10, a portion of the housing 12 of the optical disk drive 10 is omitted in FIG. 2. Inside the optical disk drive 10, a spindle motor 15 on the housing 12 is capable of rotating the base 16 and further driving the optical disk 14 on the base 16. For clarity, FIG. 2 only shows a portion of the optical disk 14. The sled 18 slides left and right on a path 30 along a direction 34 shown in FIG. 2. The sliding of the sled 18 is driven by a driving device 20. The driving device 20 comprises a driving motor 20a installed inside the housing 12, a gear 20b rotated by the driving motor 20a and a sawtooth plate 20c on the sled 18. When the driving motor 20a rotates the gear 20b, the sawtooth plate 20c, engaging with the gear 20b, pushes the sled 18 to slide left and right along the slide 30. For reading high-density data stored on the optical disk 14, the sled 18 controls an actuator 22, which is capable of moving left and right in a direction 36 within a predetermined range on the sled 18, as shown in FIG. 2. A lens 32 is installed on the actuator 22, and connects with a light source 26 installed on the sled 18. Light (for example, a laser) is emitted from the light source 26 and passes through the lens 32 on the actuator 22 optically, and then shines on the bottom surface of the optical disk 14. The light reflected from the optical disk 14 passes through the lens 32 on the actuator 22. The light is then sent back to the sled 18, so that the optical disk drive 10 is capable of reading the data stored on the optical disk 14. Meanwhile, the actuator 22 slides left and right on the sled 18, and is driven by a servo device 24 on the sled 18. The servo device 24 provides a push force to drive the actuator 22 left and right.

In order to read the high-density data stored on the optical disk 14 well, the optical disk drive 10 comprises a control system for controlling the operation of the actuator 22 and the sled 18. Please refer to FIG. 3. FIG. 3 is a diagram of the control system of the optical disk drive 10 according to the prior art. In the current optical disk standard, data is written onto the optical disk 14 along tracks. The optical disk shown in FIG. 3 shows one of the tracks 46 with data stored therein. For reading data on the track 46, the sled 18 and the actuator 22 on the optical disk drive 10 must make the lens 32 lock the position of the track 46. Therefore, the optical disk drive 10 is capable of reading data stored on the track 46 with the rotation of the optical disk 14. For this purpose, the control system of the optical disk drive 10 comprises a control circuitry 38 for controlling the operation of the optical disk drive 10. The control circuitry 38 has a compensation device 48 for controlling both the driving device 20 and the servo device 24. Furthermore, a sensor 28 is installed on the sled 18 and is connected with the actuator 22. This means that the light emitted from the light source 26 passes through the lens 32 and shines incident onto the optical disk 14. The light may be reflected from the optical disk 14 into the sensor 28 by passing through the lens 32 on the actuator 22 again. By analyzing the light incident on the sensor 28, the sensor 28 is capable of sensing whether the lens 32 locks on the track 46. The result is then transmitted into the control circuitry 38. According to this result, the control circuitry 38 makes the compensation device 48 to control the driving device 20 and the servo device 24 for adjusting the operation of the sled 18 and the actuator 22 respectively. Therefore, the lens 32 is able to lock the track 46, and the optical disk drive 10 reads data stored on the track 46 of the optical disk 14 correctly.

The control system of the prior optical disk drive 10 is used for locking the track 46. The control circuitry 38 controls the operation of the sled 18 and the actuator 22 through the driving device 20 and the servo device 24 respectively. Compared with the actuator 22, the move range of the sled 18 is larger, but the response of the control circuitry 38 is slower. In addition, the movement of the sled 18 is not very accurate, so it can only make a rough locking motion. On the other hand, the move range of the actuator 22 is smaller, but the response is quicker. So the actuator 22 is able to make an accurate locking. The control circuitry 38 controls both the sled 18 and the actuator 22, so the control circuitry 38 needs to give consideration to both kinds of track locking. The control of the sled 18 and the actuator 22 is not only related with the control circuitry 38, but also related with the mechanical characteristics of the driving device 20 and the servo device 24. Please refer to FIG. 3 again. The servo device 24 provides a pushing force to push the actuator 22 left and right within a predetermined range 40 on the sled 18, but the relationship between the push force received by the actuator 22 and the displacement of the actuator 22 within the predetermined range may change due to different positions of the actuator 22 in the predetermined range. The predetermined range 40 is divided into a linear region 44 and a non-linear region 42. In the linear region 44, the push force, provided by the servo device 24 for pushing the actuator 22, has a linear relationship with the displacement of the actuator 22. Relatively, within the non-linear region 42 of the predetermined range 40, the push force received by the actuator 22 has a non-linear relationship with the displacement of the actuator 22.

In the linear region 44, the control circuitry 38 provides a push force to the actuator 22 through the servo device 24. This push force controls the position of the actuator on the sled 18 and keeps the linear relation between the sled 18 and the actuator 22. Alternatively, in the non-linear region 42, the control circuitry 38 22 would be unable to control and the position of the actuator 22 on the servo device 24 is unknown. Thus, the control circuitry 38 would be unable to keep the relation of the sled 18 and the actuator 22 in the non-linear region 42. Once the relation between the sled 18 and the actuator 22 is unknown, the optical disk drive 10 may be unable to lock the track 46 and read data stored on the optical disk 14 correctly. When designing the compensation device 48 of the control circuitry 38, designers may specially set the relation between the sled 18 and the actuator 22 so as to keep the position of the actuator 22 within the linear region 44 of the predetermined range 40.

In modern industry, there are many components inside an optical disk drive. The driving device 20, the sled 18, the servo device 24, the actuator 22, and the control circuitry 38 may be from different vendors. The design of the compensation device 48 had better according to the specifications of the hardware device. However, there may be some inevitable errors during production, and the produced hardware device may be some different from the specifications of the original design. Although the compensation device 48 of the control circuitry 38 is designed according to the specifications of the hardware device so as to keep the actuator 22 inside the linear region 44 on the sled 18, there may be some negative effects on the set relation control in the compensation device 48. Therefore, the optical disk drive 10 may be unable to lock the track 46 fast and correctly. Of course, a poor design of the compensation device 48 also deteriorates the relationship, and lets the actuator 22 enter the non-linear region 42, making the actuator 22 difficult to control. Further, the deviation phenomenon caused by poor manufacturing of the optical disk 14 can also deteriorate the relationship. The run-out phenomenon of the optical disk 14 is caused when the rotation axis of the base 16 and the center of the circular optical disk 14 do not match. Ultimately, the run-out phenomenon makes the position of the track 46 on the optical disk 14 unpredictable. In the optical disk drive with high access rate, the rotation speed of the optical disk 14 is especially high, so that the negative effect on tracking caused by the run-out phenomenon is obvious. In this case, the rotation of the track 46 is not circular when the optical disk 14 rotates. Therefore, the sled 18 and the actuator 22 also need to change position quickly so as to lock the track 46. If the control response of the relation is too slow, then the actuator may unexpectedly enter into the non-linear region.

SUMMARY OF INVENTION

It is therefore a primary objective of the claimed invention to provide an optical disk drive with an adaptive compensator for the driving device to provide a supplementary force to the sled when the sled is near the non-linear region. The supplementary force drives the actuator away from the non-linear region.

The claimed invention, briefly summarized, discloses an optical disk drive for accessing data stored on an optical disc. The optical disk drive comprises: a sled, a driving device for driving the sled, an actuator installed on the sled, a servo device for providing a push force to drive the actuator, a control circuitry for controlling operations of the optical disk drive, an adaptive compensator, and an error signal generation circuit. The actuator is capable of moving within a predetermined range on the sled. When the actuator is within a linear region of the predetermined range, a displacement of the actuator on the sled has a linear relationship with the push force, and when the actuator is within a non-linear region of the predetermined range, the displacement of the actuator on the sled has a non-linear relationship with the push force. The control circuitry includes a compensation device for providing a driving force to drive the sled. In addition, the adaptive compensator makes the driving device to provide a supplementary force to the sled so as to prevent the actuator from entering the non-linear region. The error signal generation circuit generates an error signal according to a relationship between the actuator and the optical disc. The adaptive compensator makes the driving device to provide a supplementary force to push the sled according to the error signal so as to prevent the actuator from entering the non-linear region.

It is an advantage of the claimed invention that the optical disk drive has an adaptive compensator. When the compensation device does not control well and the magnitude of the error signal is too large, then the adaptive compensator is able to provide a supplementary force through the driving device so as to keep the actuator within the linear region and lock tracks correctly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
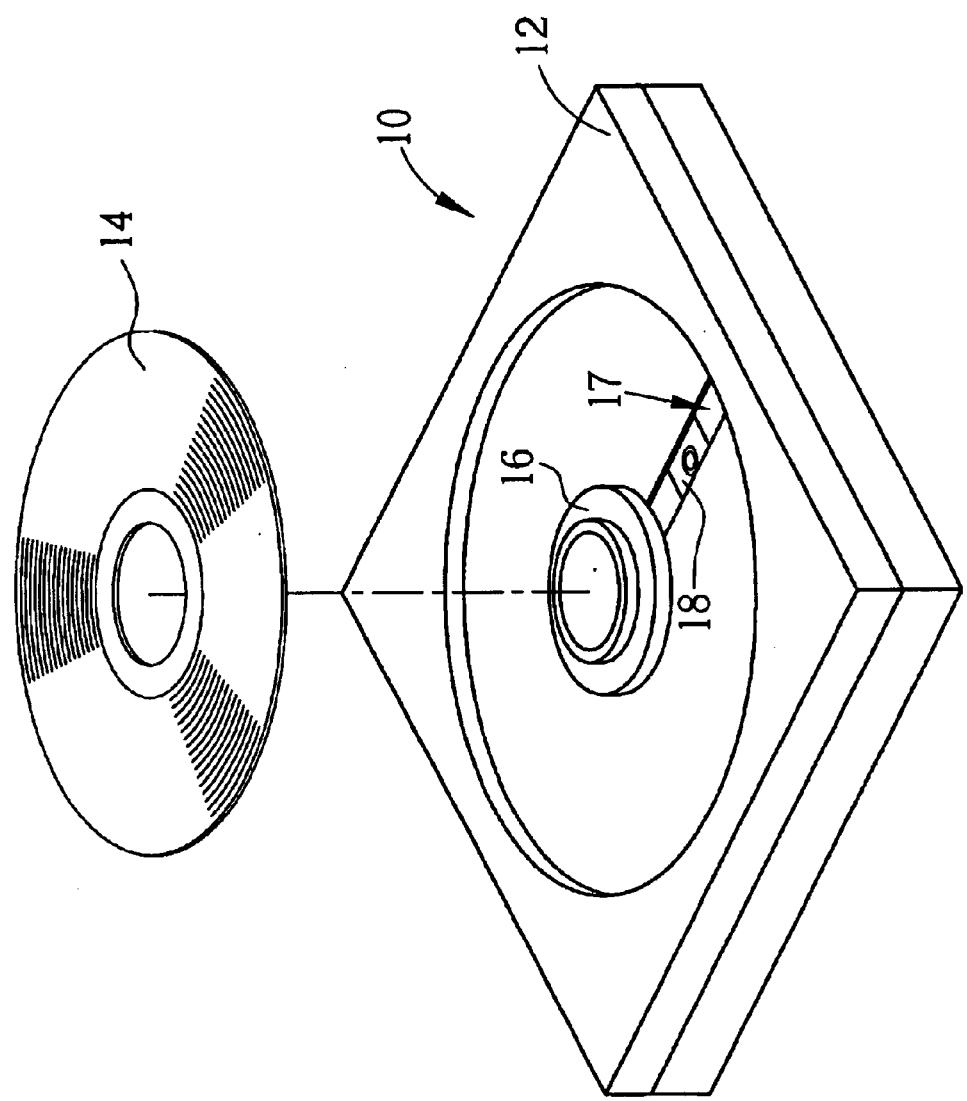
FIG. 1 is a perspective view of an optical disk drive according to the prior art.
Figure 2:
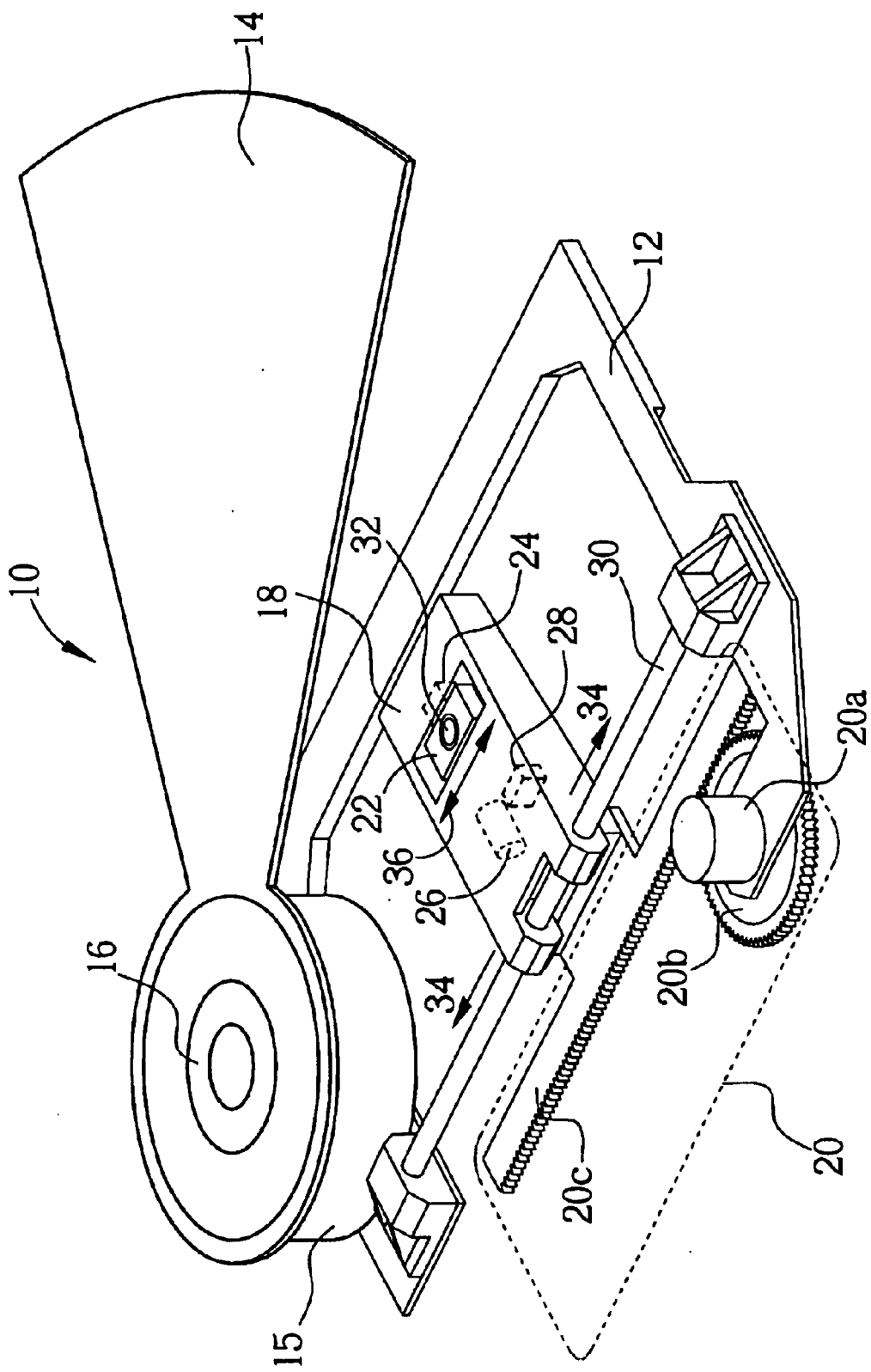
FIG. 2 is a perspective view of inner structure of the optical disk drive according to the prior art.
Figure 3:
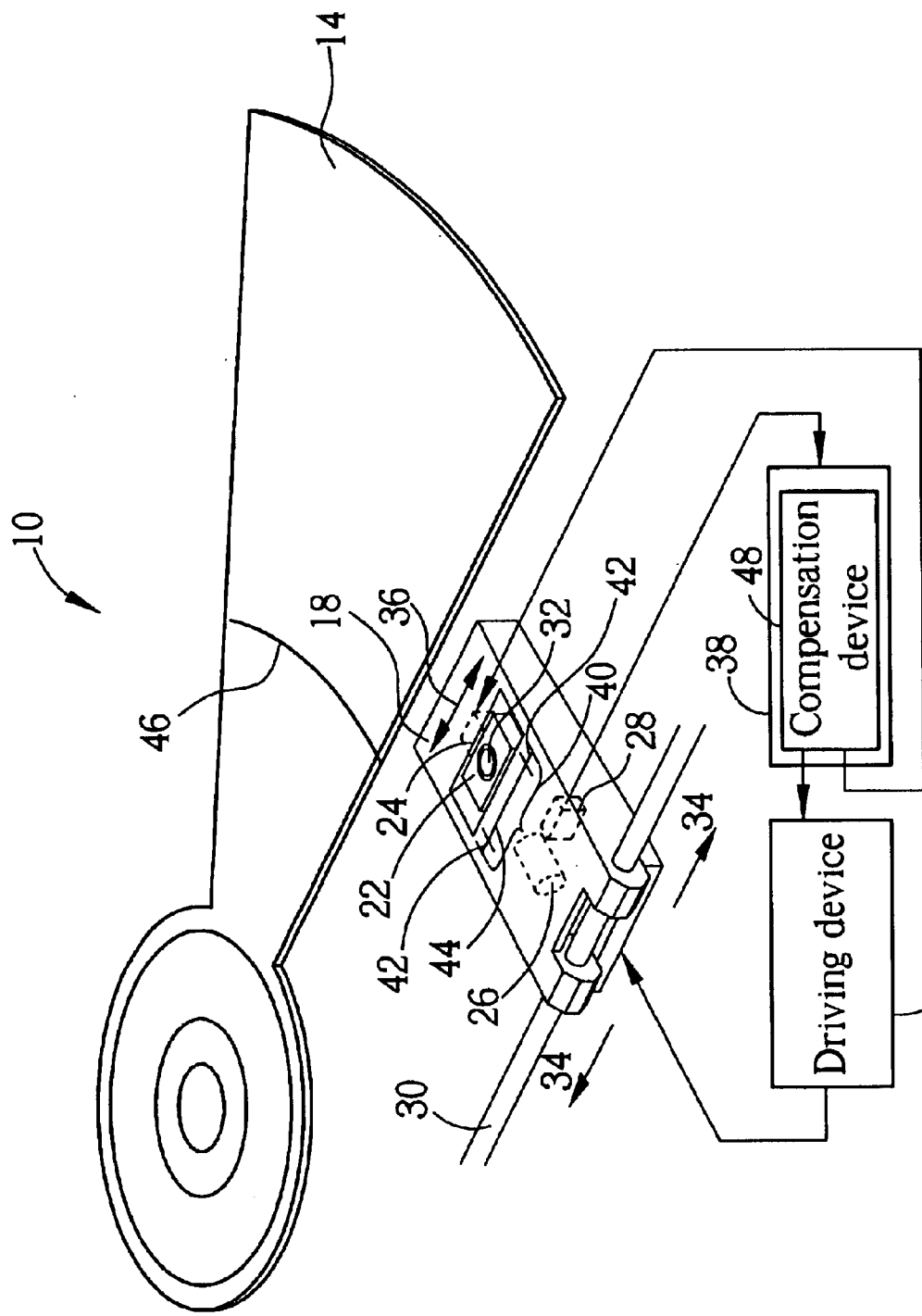
FIG. 3 is a diagram of the control system of the optical disk drive according to the prior art.
Figure 4:
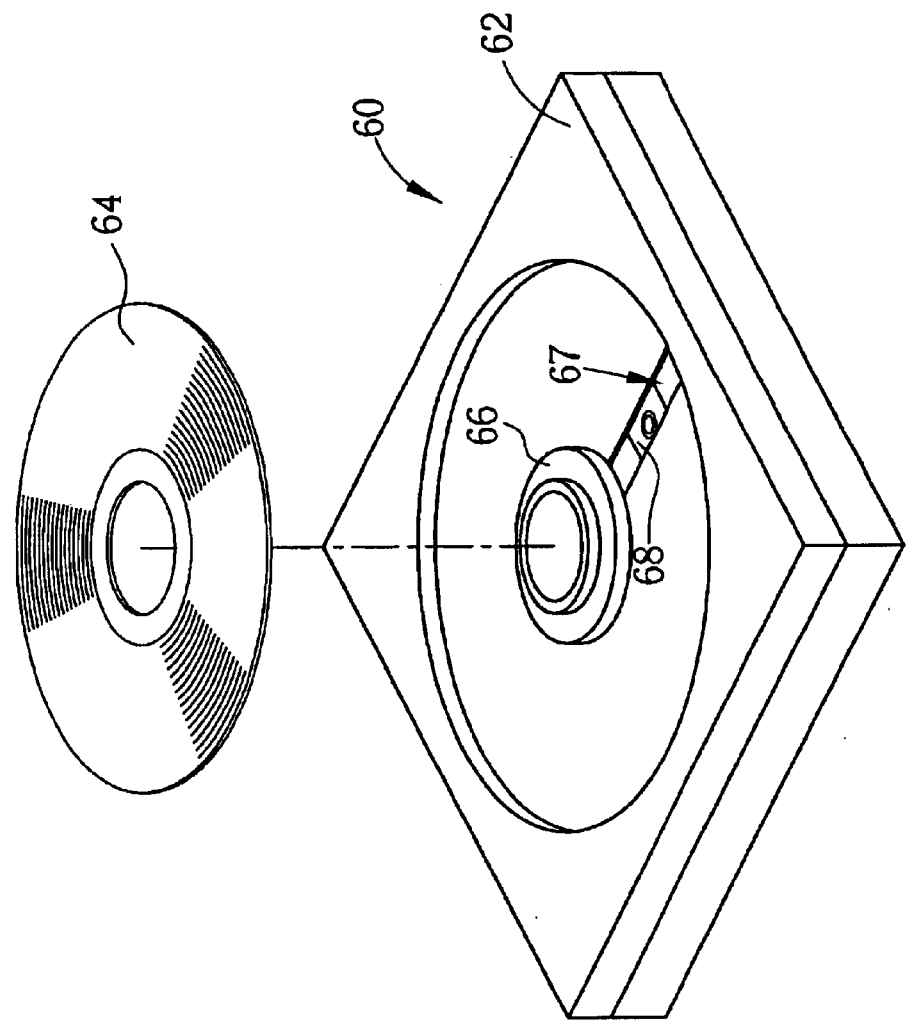
FIG. 4 is a diagram of an optical disk drive according to the present invention.

Please refer to FIG. 4. FIG. 4 is a simplified diagram of an optical disk drive 60 according to the present invention. The optical disk drive 60 comprises a housing 62, a rotatable base 66 on the housing 62 for rotating an optical disk 64. A sled 68 slides inside the housing 62. A hole 67 on the housing 62 is able to let the sled 68 slide left and right so as to read data stored on the optical disk 64.

Figure 5:
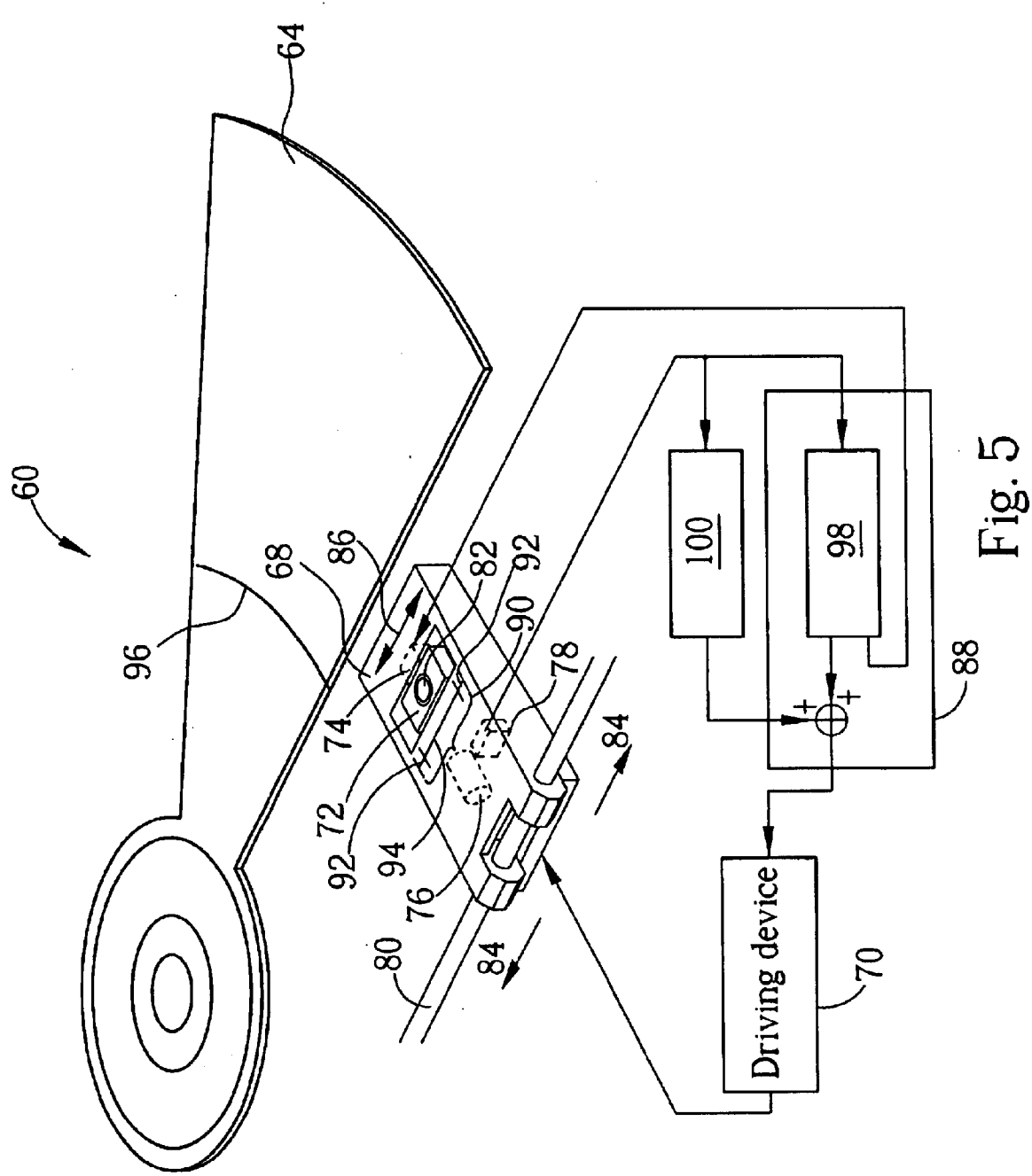
FIG. 5 is a diagram of a control system of the optical disk drive according to the present invention.

In order to read data stored on the optical disk 64 effectively, the optical disk drive 60 comprises a control system. Please refer to FIG. 5. FIG. 5 is a simplified diagram of the control system of the optical disk drive 60. The sled 68 of the optical disk drive 60 is driven by a driving device 70 so as to slide left and right (along a direction 84) on a path 80. The actuator 72 accepts a push force provided by a servo device 74 and moves left and right (along a direction 86) within a predetermined range 90 on the sled 68. The driving device 70 of the optical disk drive 60 is not limited by the description of the invention. A lens 82 is installed on the actuator 72. A light source 76 and a sensor 78 installed on the sled 68 are optically coupled with the actuator 72. Light (always a laser) is emitted from the light source 76 and then optically passed through the lens 82 on the actuator 72. Then light shines on the optical disk 64. The light reflected from the optical disk 64 also passes through the lens 82 to the actuator 72. A portion of the reflected light is provided to the sled 68 for reading data stored on the optical disk 64 and another portion of it is incident to the sensor 78. In order to make the lens 82 to focus on tracks 96 on the optical disk 64, the sensor 78 is able to analyze the received light and judge whether the light, emitted from the light source 76 and passed through the lens 82, is focused on the track 96 of the optical disk 64 correctly or not. If the actuator 72 is unable to lock the position of the track 96 correctly, then the light is unable to focus on the track 96. The sensor 78 generates an error signal. If the position of the actuator 72 away from the position of the correct track 96 is farther, the magnitude of the error signal may be greater. A control circuitry 88 inside the optical disk drive 60 receives the error signal, which is generated by the sensor 82. In order to control the sled 68 and the actuator 72 to lock the position of the track 96 correctly, the control circuitry 88 comprises a compensation device 98 for making the driving device 70 to provide a driving force to drive the sled 68. Besides the above control circuitry 88 and the compensation device 98, an adaptive compensator 100 is added. The compensation device 98 keeps the relation between the actuator 72 and the sled 68. The adaptive compensator 100 is to supplement the compensation device 98 to control the relation.

As discussed before, the prior optical disk drive 10 comprises a compensation device 48 for controlling the relation between the sled 18 and the actuator 22 by controlling the driving device 20 and the servo device 24. Nevertheless, in the event of low quality hardware devices in the optical disk drive 10, bad design of the control circuitry 38, or run-out of the optical disk 14, the relation is hard to be maintained. In order to supplement the compensation device 98, the optical disk drive 60 further comprises the adaptive compensator 100 so as to keep the actuator 72 within the linear region 94 of the predetermined range 90. The operation of the adaptive compensator 100 is described as below. First, the adaptive compensator 100 reads the error signal. According to the error signal, the adaptive compensator 100 judges whether the actuator 72 is near the non-linear region 92 of the predetermined range 90 or not. An embodiment of the decision rule is accordance with whether the magnitude of the error signal is greater than a predetermined value or not. In a general situation when the compensation device 98 is able to control the relation between the actuator 72 and the sled 68 so as to keep the actuator 72 within the linear region 94 and to lock the position of the track 96, the magnitude of the error signal should be small. On the other hand, if the magnitude of the error signal is greater than a predetermined value, the compensation device 98 is unable to control the relation between the actuator 72 and the sled 68. This means the actuator 72 is unable to lock the track 96 and that the actuator 72 is near the non-linear region 92. In the non-linear region 92, the position of the actuator 72 has a non-linear relationship with the push force provided by the servo device 74. Therefore the control module designed for the linear relationship in the compensation device 88 loses effectiveness, and the relation between the actuator 72 and the sled 68 is unable to maintain.

The adaptive compensator 100 of the optical disk drive 60 is able to prevent the actuator 72 from entering into the non-linear region 92. When the adaptive compensator 100 decides that the actuator 72 is near the non-linear region 92 (as described before, this means the magnitude of the error signal is greater than a predetermined value), then it makes the driving device 70 to provide a supplementary force to drive the sled 68. The supplementary force combines with the original driving force, which the compensation device 98 uses to control the driving device 70, so as to push the sled 68. Once the sled 68 is moved away from this original position by the supplementary force provided by the adaptive compensator 100, the compensation device 98 uses the new position of the sled 68 to adjust the position of the actuator 72 again. This keeps the position of the actuator 72 away from the non-linear region 92. When the actuator 72 comes back to the linear region 94 again, the control module of the compensation device 98 becomes effective again. The control module is then able to use the relation between the sled 68 and the actuator 72 to lock the track 96 and reduce the magnitude of the error signal. Since the magnitude of the error signal is reduced, the adaptive compensator 100 judges that the actuator 72 already come back to the linear region 94 and is far away from the non-linear region 92. The adaptive compensator 100 no longer makes the driving device 70 to provide the supplementary force to the sled 68 as the compensation device 98 is able to control the relation and lock the track 96 effectively.

In general, the error signal generated by the sensor 78 is not only capable of representing the degree of the actuator 72 deviation from the target track position, but also capable of representing the actuator 72 deviation to the left or right side of the target track position by positive or negative symbol. The adaptive compensator 100 of the present invention is able to use the magnitude and the symbol of the error signal to set the magnitude and the direction of the supplementary force. This allows the sled 68 to move for the purpose of reducing the error signal. The compensation device 98 could then adjust the position of the actuator 72 again according to the new position of the sled 68.

As the embodiment of the present invention stated before, the adaptive compensator 100 judges if the actuator 72 is already near the non-linear region 92 according to whether the magnitude of the error signal is greater than a predetermined value. In general, the demarcation line between the linear region 94 and the non-linear region 92 is not especially clear, and it may change due to a change of the mechanical characteristics of the servo device 74 and the actuator 72. Therefore, it is possible to adjust the predetermined value smaller so as to prevent the actuator 72 from entering the non-linear region 92. Thus, if the actuator 72 has a small deviation range relative to the correct locking position inside the linear region 94, the magnitude of the error signal is greater than the predetermined value. Then the adaptive compensator 100 makes the actuator 72 away from the non-linear region 92. Further, the magnitude of the predetermined value also has a relationship with the time domain response. If the time domain response is slower, then the movement response of the sled 68 and the actuator 72 may be longer. If the response is too slow, the actuator 72 may enter the non-linear region 92. To prevent the above situation, it is also possible to adjust the predetermined value to a smaller value.

Therefore, the adaptive compensator 100 could provide the supplementary force through the driving device 70 faster.

Figure 6:
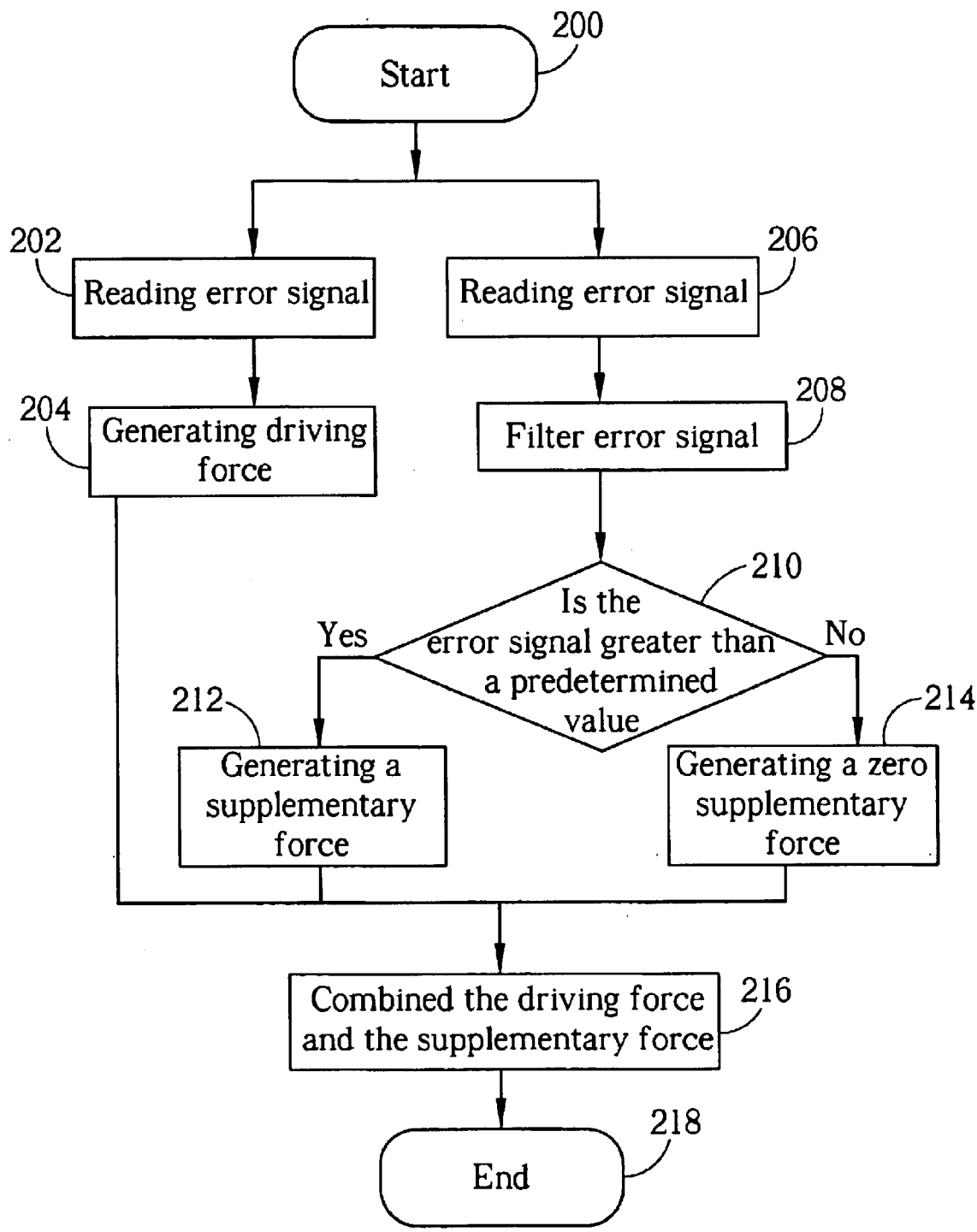
FIG. 6 is a flow chart of a control method of the present invention.

In conclusion, the spirit of the present invention is to use an additional adaptive compensator 100 inside an optical disk drive 60. When the actuator 72 is already near the non-linear region 92 but the compensation device 98 is unable to provide enough driving force to push the sled 68 so that to force the actuator 72 far away from the non-linear region 92, the adaptive compensator 100 is able to provide a supplementary force through the driving device 70. The position of the sled 68 is adjusted again so as to make the actuator 72 capable of locking the track 96 correctly. To see a summary of the control method of the optical disk drive used in the present invention, please refer to FIG. 6. FIG. 6 is a flow chart of a control method according to the present invention, which comprises the following steps.

Step 200: The control method begins.

Step 202: The error signal is read.

Step 204: The driving force is generated to drive the driving device, and then the method jumps to step 216.

Step 206: The error signal is read.

Step 208: A low pass filter is used to filter the error signal so as to exclude the interfere noise of the error signal.

Step 210: It is checked that the magnitude of the error signal is greater than a predetermined value or not. If yes, the method jumps to step 212, otherwise to step 214.

Step 212: A non-zero supplementary force is generated to control the sled, and the method jumps to step 216.

Step 214: A zero supplementary force is generated, i.e., a supplementary force is not generated.

Step 216: The driving force and the supplementary force are combined to control the sled.

Step 218: The control method is terminated.

The control method as above may be repeated in the optical disk drive, so as to control the operation of the optical disk drive correctly.

In the above discussion, the optical disk drive for reading data stored on the optical disk is only exemplificative. Since the adaptive compensator 100 is used for preventing the actuator 72 from entering into the non-linear region 92, the principle and the spirit of the invention is also suitable for a recordable/re-writable optical disk drive for writing data onto the optical disk.

The prior art optical disk drive 10 includes the compensation device 48 for controlling the relation between the sled 18 and the actuator 22. However, the optical disk drive 60 according to the present invention additionally comprises the adaptive compensator 100 installed in the compensation device 98. When the compensation device control is insufficient for compensation and the magnitude of the error signal is too large, the adaptive compensator 100 is able to provide a supplementary force through the driving device 70 so as to keep the actuator 72 within the linear region 94 and lock the track 96 correctly. The control method of the prior art optical disk drive only simply generates a driving force to control the sled 18.

Those skilled in the art will readily observe that numerous modifications and alterations of the device may be made while retaining the teachings of the invention. Accordingly, the above disclosure should be construed as limited only be the metes and bounds of the appended claims.

What is claimed is:

1. An optical disk drive for accessing data stored on an optical disc, comprising:

a sled;

a driving device for driving the sled;

an actuator on the sled and moveable within a predetermined range on the sled;

a servo device for providing a push force to drive the actuator wherein when the actuator moves within a linear region of the predetermined range, a displacement of the actuator on the sled has a linear relationship with the push force; and when the actuator moves within a non-linear region of the predetermined range, the displacement of the actuator on the sled has a non-linear relationship with the push force;

a control circuitry for controlling the optical disk drive, the control circuitry comprising a compensation device for making the driving device to provide a driving force to drive the sled; and an adaptive compensator for making the driving device provide a supplementary force to the sled so as to drive the actuator away from the non-linear region;

wherein the adaptive compensator makes the driving device provide the supplementary force to push the sled according to an error signal so as to drive the actuator away from the non-linear region.

2. The optical disk drive of claim 1, wherein the adaptive compensator makes the driving device provide the supplementary force to push the sled when a magnitude of the error signal is greater than a predetermined value so as to drive the actuator away from the non-linear region.

3. A method for controlling an optical disk drive to access data stored in an optical disc, the optical disk drive comprising:

a sled;

a driving device for driving the sled;

an actuator installed on the sled and moveable within a predetermined range on the sled; and a compensation device for making the driving device provide a driving force to drive the sled;

the method comprising:

detecting if the actuator is near to a non-linear region of the predetermined range; and providing a supplementary force in addition to the driving force to drive the sled so as to drive the actuator away from the non-linear region of the predetermined range if the actuator is near the non-linear region of the predetermined range.

4. The method of claim 3 further comprising the steps of:

generating an error signal according to a position relationship between the actuator and the compact disc; and determining that the actuator is near the non-linear region of the predetermined range if the magnitude of the error signal is greater than a predetermined value.

5. A method for controlling an optical disk drive to access data stored in an optical disc, the optical disk drive comprising:

a sled;

a driving device for driving the sled;

an actuator installed on the sled and moveable within a predetermined range on the sled;

a compensation device for making the driving device provide a driving force to drive the sled; and a light source connected to the actuator for emitting light onto the compact disc;

the method comprising:

measuring an error of focusing the light onto a track of the optical disc and generating a corresponding error signal;

providing a supplementary force in addition to the driving force to drive the sled so as to drive the actuator away from the non-linear region of the predetermined range if a magnitude of the error signal is greater than a predetermined value.

6. The method of claim 5, wherein the light source is capable of emitting light for writing data onto the compact disc.

* * * * *